(12) United States Patent
Panchbudhe et al.

(10) Patent No.: US 8,121,982 B1
(45) Date of Patent: Feb. 21, 2012

(54) DATA TRANSFERS FROM MOBILE DEVICES WITH CELL-SITE STAGING

(75) Inventors: Ankur P. Panchbudhe, Pune (IN); Angshuman Bezbaruah, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 1019 days.

(21) Appl. No.: 11/809,422

(22) Filed: May 31, 2007

(51) Int. Cl.
*G06F 17/30* (2006.01)

(52) U.S. Cl. ........................................ 707/652; 707/653

(58) Field of Classification Search ........... 707/640–654
See application file for complete search history.

(56) References Cited

U.S. PATENT DOCUMENTS

| 7,505,762 | B2 * | 3/2009 | Onyon et al. | 455/419 |
|---|---|---|---|---|
| 2003/0134625 | A1 * | 7/2003 | Choi | 455/418 |
| 2007/0207729 | A1 * | 9/2007 | Chen et al. | 455/15 |
| 2008/0070496 | A1 * | 3/2008 | Jackson | 455/3.03 |
| 2010/0077453 | A1 * | 3/2010 | Mohanty | 726/3 |

OTHER PUBLICATIONS

"ATTIX⁵", web page, downloaded Jun. 1, 2007, from http://www.headway.co.uk/products/storage/attix5/attix5.htm.
"ATTIX⁵ Backup Professional Desktop & Laptop Edition" brochure, downloaded Jun. 1, 2007, from http://www.headway.co.uk/products/storage/attix5/A5-BP-DL-Brochure.djvu, 2004.

* cited by examiner

*Primary Examiner* — Khanh Pham
(74) *Attorney, Agent, or Firm* — Campbell Stephenson LLP (57) ABSTRACT

Data uploaded from a mobile unit to a remote site can be buffered at an intermediate wireless base station, allowing an initial wireless link to be rapidly terminated and freed for other uses. In one implementation, a method includes forming a wireless link between a device and a first wireless receiver site, receiving a portion of a data set from the device, relinquishing the wireless link, and then transmitting the portion of the data set from the first wireless receiver site to a service provider. In another implementation, a method includes receiving, via an intermediate wireless base station, a backup request and a portion of data to be backed up from a device. The portion of the data to be backed up is received after a wireless link between the device and the wireless base station has been terminated.

16 Claims, 7 Drawing Sheets

DATA TRANSFERS FROM MOBILE DEVICES WITH CELL-SITE STAGING

BACKGROUND OF THE INVENTION

1. Field of the Invention

The present invention relates to mobile data communication, and more particularly, to the transfer of data from a mobile device to a data storage facility.

2. Description of the Related Art

Mobile computing devices are becoming ever more common, and services for these devices are increasing in versatility and demand. Users of these devices increasingly rely on the convenience provided by mobile telephones, personal digital assistants, laptop computers, and other mobile devices. As users depend more and more on these devices and their services, designers and service providers face an increasing demand for speed, simplicity, and reliability. At the same time, there is an increasing demand to lower costs by making efficient use of equipment and infrastructure. These various demands often come into conflict as designers and service providers strive to better serve their users.

While traveling on a commuter train, for example, a user may wish to make a remote backup copy of data from a laptop computer. To create the remote backup, the user selects the files to be backed up and establishes a wireless connection that enables access to the Internet. Through the Internet, the user then reaches a remote site that provides backup storage. The remote site can be, for example, a service provider that provides storage for data in return for a fee from the user. The user may manually copy the selected files onto the remote backup storage through the wireless connection.

A variety of challenges and inefficiencies are presented by this operation. First, this backup operation may include a large portion of redundant copying. Second, this operation may include an inefficient under-utilization of some portions of the communications link between the laptop computer and the remote site. Third, this operation depends heavily on management and oversight by the user. It would be helpful to have systems and techniques that reduce one or more of these burdens.

SUMMARY

Described herein are various systems and methods for performing data backups, data archiving, and/or other data uploads. The techniques described herein may be used, for example, for better utilizing one or more portions of a data path that operate at speeds greater than other portions of the data path. One example is the final wireless link between a mobile device and a wireless base station. In some situations, the wireless link can upload data from the mobile device to the base station faster than the base station can forward the data to an ultimate upload destination. In such situations, it may be helpful to buffer the data at the wireless base station, allowing the wireless link to be terminated and promptly freed for other uses.

In one implementation, a method includes forming a first wireless link between a device, such as a PDA for example, and a first wireless receiver site, such as a cellular telephone base station, for example, and receiving a portion of a data set from the device. The first wireless link is relinquished, and then the portion of the data set is transmitted from the first wireless receiver site to a service provider. In various circumstances, this portion of the data set may follow other portions that were forwarded to the service provider before the first wireless link was relinquished. The data set can include backup data, archival data, or other data uploaded to the service provider.

The method can further include receiving a second portion of the data set from the device at a second wireless receiver site, and transmitting the second portion of the data set from the second wireless receiver site to the service provider. The service provider can then reconstruct the data set using the first and second portions of the data set and transmit a confirmation to the device.

In one implementation, a system includes a memory and a staging module coupled to the memory. The staging module is configured to receive, via a wireless connection from a device, data for uploading to a remote site. The staging module is also configured to transmit a first portion of the data to the remote site while receiving a second portion of the data from the device, to store the second portion of the data in the memory, and to terminate the wireless connection after receiving the first and second portions of the data. The staging module is configured to then transmit the second portion of the data to the remote site.

Also disclosed is a method that includes, in one implementation, receiving a backup request and a first portion of data to be backed up from the device. The first portion of data is received through a first wireless base station. The first portion of the data is received after a wireless link between the device and the first wireless base station has been terminated.

The foregoing is a summary and thus contains, by necessity, simplifications, generalizations and omissions of detail. Consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

Figure 1A:
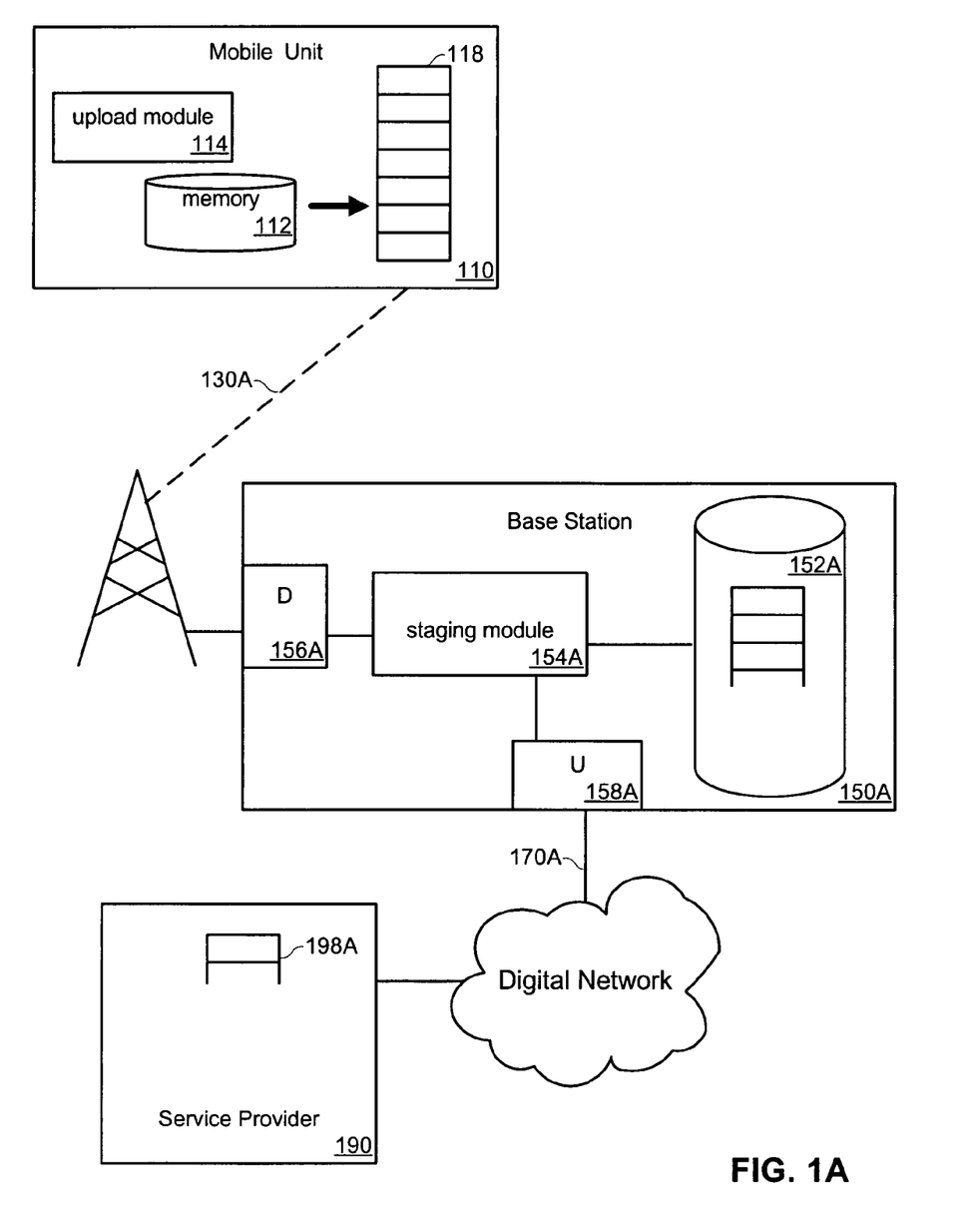
FIGS. 1A-1C shows one implementation of a data upload from a mobile unit to a remote backup service provider.

FIG. 1A shows one implementation of a data upload from a mobile unit 110 to a remote backup service provider 190. The communication takes place through a wireless link 130A that connects mobile unit 110 with an intermediate base station 150A, and through a network connection 170A that provides connections between base station 150A and backup service provider 190.

Mobile unit 110 includes a memory 112 that can be used to hold various forms of data, such as documents, multimedia files, and address books. A user may wish to store securely one or more redundant copies of some or all of this data. One approach to achieving this redundancy is to store a backup copy of data at a remote site, such as at a site maintained by backup service provider 190. The backup copies would then be available in the event that mobile unit 110 is damaged, destroyed, or lost.

An upload module 114 in mobile unit 110 gathers data to be backed up. The gathering is performed automatically, by examining data stored in memory 112 to determine which files, metadata, or other information have been created or modified since the most recent backup operation. The data to be backed up include only the new or revised data. The gathered data is thus an incremental backup of the data stored in memory 112. (As discussed below, a large variety of other embodiments of the mobile unit are contemplated, such as embodiments that perform full backups instead of, or in addition to, incremental backups.) The gathered data are represented in FIG. 1 by an upload data set 118. Upload data set 118 is a data file that includes all the new or revised data, as well as information on how the new or revised data can be used to reconstruct the current data in memory 112. Upload module 114 then automatically initiates communication with base station 150A. If needed, upload module 114 establishes wireless link 130A to communicate with base station 150A. Upload module 114 then transmits upload data set 118 to backup service provider 190 via wireless link 130A and base station 150A.

Upload data set 118 is buffered at base station 150A. In various situations, this buffering can facilitate the efficient utilization of wireless link 130A. Without such buffering, the base station serves merely as another element in a communications path that connects a mobile unit to a service provider. In various deployments, the overall speed of such a path may to some extent be determined by the slowest link in the path. If the wireless link is not the slowest link in the path, then the wireless link can be significantly under-utilized while data is slowly transferred at a rate that can be supported by other links in the path. Various factors can lead to such a situation.

One possible situation is where the wireless link supports a higher peak transfer rate than another link in the path. For example, if a network connection between the base station and the service provider is limited to 0.5 Mb/s (megabits per second), then the overall speed of the path will be 0.5 Mb/s, even though a wireless connection between the mobile unit and the base station can support a higher data rate, such as 1.8 Mb/s.

Another situation that can lead to under-utilization of the wireless link is where the average transmission rate of the wireless link is greater than the average transmission rate of subsequent portions of the path. This situation may arise, for example, from delays caused by a large number of inter-node hops in subsequent portions of the path. The network connection between the base station and the service provider can include multiple intermediate network nodes (not shown). Delays are introduced for transmitted data packets at each of the intermediate nodes, along with transmission delays between each of the intermediate nodes. These delays slow down the transfer of data through the network connection. These delays can especially impact the average data rate if the communications path requires the acknowledgement of packets before subsequent packets can be transmitted. In such situations, the most significant limitation on the average data rate can be the round-trip time between the transmission of a data packet from the mobile unit, and the reception back at the mobile unit of a response packet that acknowledges receipt by the service provider. A significant portion of this round-trip time can arise from delays at intermediate nodes in the network connection between the base station and the service provider. Even without round-trip considerations, the network connection between the base station and the service provider is generally a longer "pipe" than the wireless link between the mobile unit and the base station.

Buffering an upload at the base station can decouple the usable data rate of the wireless link from the usable data rate of the subsequent network connection. This decoupling can be used in various situations to operate the wireless link more efficiently.

Upload module 114 in mobile unit 110 establishes a communication path that effectively ends at a staging module 154A within base station 150A. Staging module 154A receives upload data set 118 from mobile unit 110 through wireless link 130A. Staging module 154A then retransmits upload data set 118 to backup service provider 190 using a separate communication path carried through network connection 170A.

Base station 150A also includes a downlink port 156A, an uplink port 158A, and a staging memory 152A. Downlink port 156A enables communication between base station 150A and one or more mobile units. Uplink port 158A enables communication between base station 150A and one or more communications networks. The communications networks are used to establish connections, such as network connection 170A, with other end-point devices such as service providers, mobile telephones, "land line" telephones, or computers, among others. Staging module 154A is coupled to downlink port 156A, uplink port 158A, and staging memory 152A. Staging module 154A receives upload data set 118 from mobile unit 114 through downlink port 156A. Staging module 154A stores upload data set 118 in the local staging memory 152A. Staging module 154A then retransmits upload data set 118 to backup service provider 190 through uplink port 158A.

In some implementations, staging module 154A can initiate the retransmission to the service provider before receiving the entire upload data set 118. Such an operation is illustrated in FIGS. 1A-1C.

Staging memory 152A is illustrated as having received 50% of the backup data set 118 in FIG. 1A. Although the transmission from the mobile unit to the base station is not yet complete in this snapshot, the retransmission over network connection 170A to the upload destination has already started. Backup service provider 190 is illustrated 118 in FIG. 1A as having received 20% (a portion 198A) of the backup data set 118. Any packet acknowledgements or other acknowledgements required by the communications protocols have been carried out, and if any packet errors occurred in the transmissions, duplicate packets have been sent as appropriate. Communication continues through wireless link 130A, base station 150A, and digital network 170A so that the remainder of upload data set 118 can be sent to backup service provider 190.

Figure 1B:
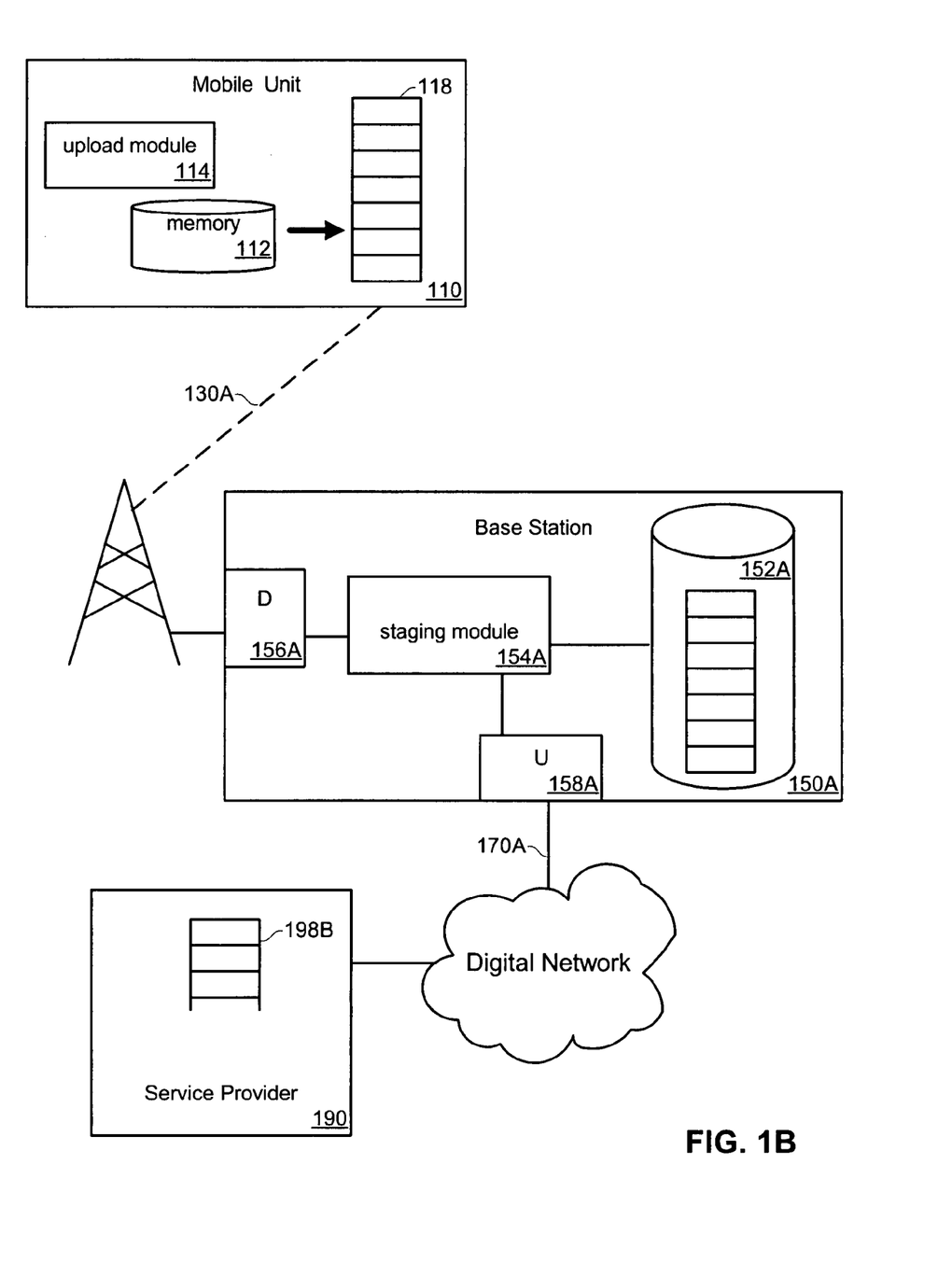
Figure 1C:
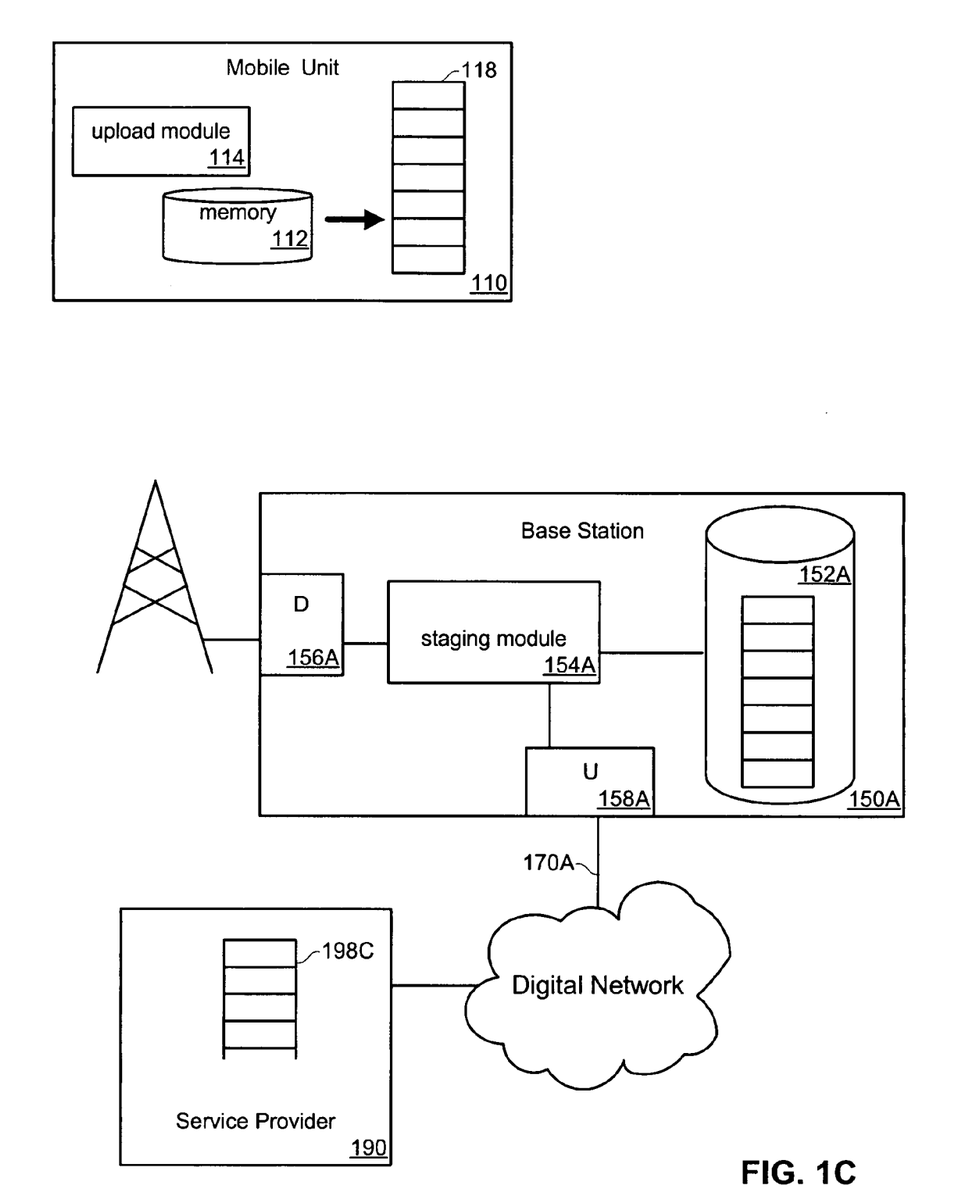

FIG. 1B shows a subsequent condition in the data upload from FIG. 1A. At this subsequent time, base station 150A has received 100% of the backup data set 118 through wireless link 130A, and a copy of the entire backup data set is illustrated as being present in staging memory 152A. Due to the comparatively slower communication over network connection 170A, however, backup service provider 190 has received only 45% (portion 198B) of the backup data set 118.

Since base station 150A has completely received backup data set 118, the capacity on wireless link 130A may be used by other operations on mobile unit 110, or may be shared with other users in multiple-access scenarios. If no other current operations on mobile unit 110 require a wireless link, then wireless link 130A can be terminated so that the capacity is available for re-assignment to other users. This relinquishing by sharing or terminating the wireless resource can be performed despite the fact that backup service provider 190 has not yet received the entire backup data set 118. The relinquishing is thus performed earlier than might occur if a wireless link needed to be maintained until the complete backup data set reached the service provider.

In various situations the early relinquishing can provide a cost savings to an operator of the wireless resource, by making the wireless resource more rapidly available for other uses. This cost savings may be passed on, through various arrangements, to a service provider and/or to a user of a mobile device. In addition, by shortening the required time during which the wireless link is involved, the early termination may make the data transfer less susceptible to interruptions in the wireless link.

FIG. 1C shows a further subsequent condition in the data upload from FIG. 1B. At this time, backup service provider 190 continues to receive backup data set 118 from base station 150A (shown as portion 198C). The wireless link 130A has been terminated, since it is no longer needed by the mobile unit in this example. When backup service provider 190 eventually receives the entire backup data set 118, the logical network connection 170A can also be terminated, and backup service provider 190 can store the backup data set appropriately.

Various forms of mobile units 110 are contemplated. For example, mobile unit 100 may be a laptop computer, a cellular telephone or other mobile telephone, a personal digital assistant (PDA), a personal media player (e.g. an mp3 player or video player), a navigation unit, a digital camera, a portable household device (e.g. a remote control unit, a cordless telephone, a multimedia device), a hand-held meter reader, or a bar-code scanner, among others, or a hybrid device that incorporates the functionality of different portable units.

The techniques described herein may also be useful in situations where a mobile device goes "out of network" or otherwise loses wireless connectivity temporarily or for some time. In such situations, the upload operation may be configured to pause until the wireless connection is re-established, and to resume after reconnection, maintaining the already-uploaded data for some time. The techniques described herein may also be useful in situations where a fixed or otherwise non-mobile or non-moving device is connected via a cellular or other wireless link to a network, or in situations where one (wireless or wired) portion of a communications path is faster than another (wireless or wired) portion of the communications path.

A user may maintain telephone numbers, address books, email addresses, and other contact information in memory 112. Memory 112 may also hold multimedia information (such as ring tones, audio clips, MPEG-1 Part 3 Layer 3 (mp3) audio files, MPEG-2 video files, JPEG image files, and other audio and visual data), documents (such as text files, word processing files, portable document format (PDF) files, spreadsheets, database files, and other electronic documents), executable software (such as games, applications for working with documents, operating system software, and telecommunications tools, and other applications and drivers), and other information (such as adaptation data for predictive text tools, wireless subscriber account information, and other data).

The wireless link 130A can be implemented in various ways. For example, the wireless link can be a digital cellular telephone link, such as an IS-95 code division multiple access (CDMA) data link, a General Packet Radio Service (GPRS) data link, a High-Speed Downlink Packet Access (HSDPA) data link, a CDMA2000 1-Times Radio Transmission Technology (1xRTT) data link, or an Evolution-Data Optimized (EV-DO) data link, among others. In these examples, base station 150A is an appropriate cellular base station, and mobile device 110 is equipped with an appropriate transceiver for communicating with the base station. If needed, mobile device 110 is provided with an appropriate subscription to access the cellular telephone system. Base stations 150A may be a hub unit connected to a wireless provider's backbone network (not shown), or may be an auxiliary unit coupled to a hub unit by wireless or copper links, or any of various other types of base station. In other environments, the wireless link 130A can be a close-range wireless data connection, such as an 802.11(a, b, g, or n) connection. In these examples, base station 150A is an appropriate base station (e.g., a "wi-fi" base station), and mobile device 110 is equipped with an appropriate transceiver and is provided with any needed access codes.

Various alternate implementations are contemplated for the systems and procedures illustrated in FIGS. 1A-1C. For example, the backup of data may involve full backups, or incremental backups, or some combination thereof. Similarly, the gathering and scheduling of backup data may be performed under manual control, automatic control, or some intermediate combination. Upload module 114 can include automatic procedures for identifying data to be backed up and for deciding when to carry out an upload of the data. Alternatively, an upload module can provide a manual interface that enables a user to select files or other data for backup, and to initiate an upload of those files or other data. As another alternative, the upload module can provide a user interface in which a user selects files or other data for regular backup operations (incremental or full backup), and prescribes a schedule for gathering and uploading the backup data.

Upload module 114 can be implemented in software that is stored in memory 112, and which is executed on a central processor in mobile unit 110. Upload module 114 can be factory installed on the mobile unit, or can be user installed, or can be "push" installed by a remote service provider. Alternatively, an upload module can be implemented in a hard-coded form within a dedicated processor. During operation, the upload data set can be gathered as an instance of a data file, as discussed above, or can be assembled in other ways, such as a collection of pointers to the original data in memory 112.

It is also contemplated that a user of mobile unit 110 may wish to transfer data to a remote site for other purposes, instead of or in addition to backup redundancy. For example, a user may wish to archive certain data, such as old files or information that are no longer expected to be commonly needed on mobile unit 110. After transferring such data to a remote site for archival storage, the original copies can be deleted from mobile unit 110. This operation can allow more efficient use of memory 112, with the archived data available for future retrieval, if needed. As another example, a user may wish to share or publish data from the mobile unit. The architecture in FIGS. 1A-1C can be readily adapted to facilitate the transfer of a video clip from a mobile unit to a world-wide web video-sharing service, or to transfer a word processing document from a mobile unit to a user's home computer, or to carry an email message (perhaps with large attachments) from the mobile unit to an email server, or to perform other uploading operations from a mobile unit. In various deployments, upload module 114 and staging module 154A are configured to cooperatively accommodate the type of upload operation being facilitated. For example, a staging module in the base station can be configured to send appropriate confirmation messages to an upload module in the mobile unit, depending on the size or type of data being uploaded, or to inform the upload module of a successful follow-up transfer to a service provider. Similarly, an upload module in the mobile unit can be configured to delete the original local version of data after receiving a confirmation that the data has been successfully received by a staging module and/or uploaded to an archive service.

In various implementations, the staging module in the base station can simplify operations by emulating some of the function of the remote service. Such emulation can be achieved in some situations by coordinating operations with the remote service provider, so that the staging module can generate response messages that would normally originate from the service provider. It is contemplated that in some implementations, the staging module in the base station can operate as a front end for a service provider. In some deployments of such a front-end system, the staging may be completely transparent to the mobile unit. In such situations, if the service provider interface has been substantially reproduced at the base station, it may not be necessary to deploy an upload module in the mobile unit.

Figure 2A:
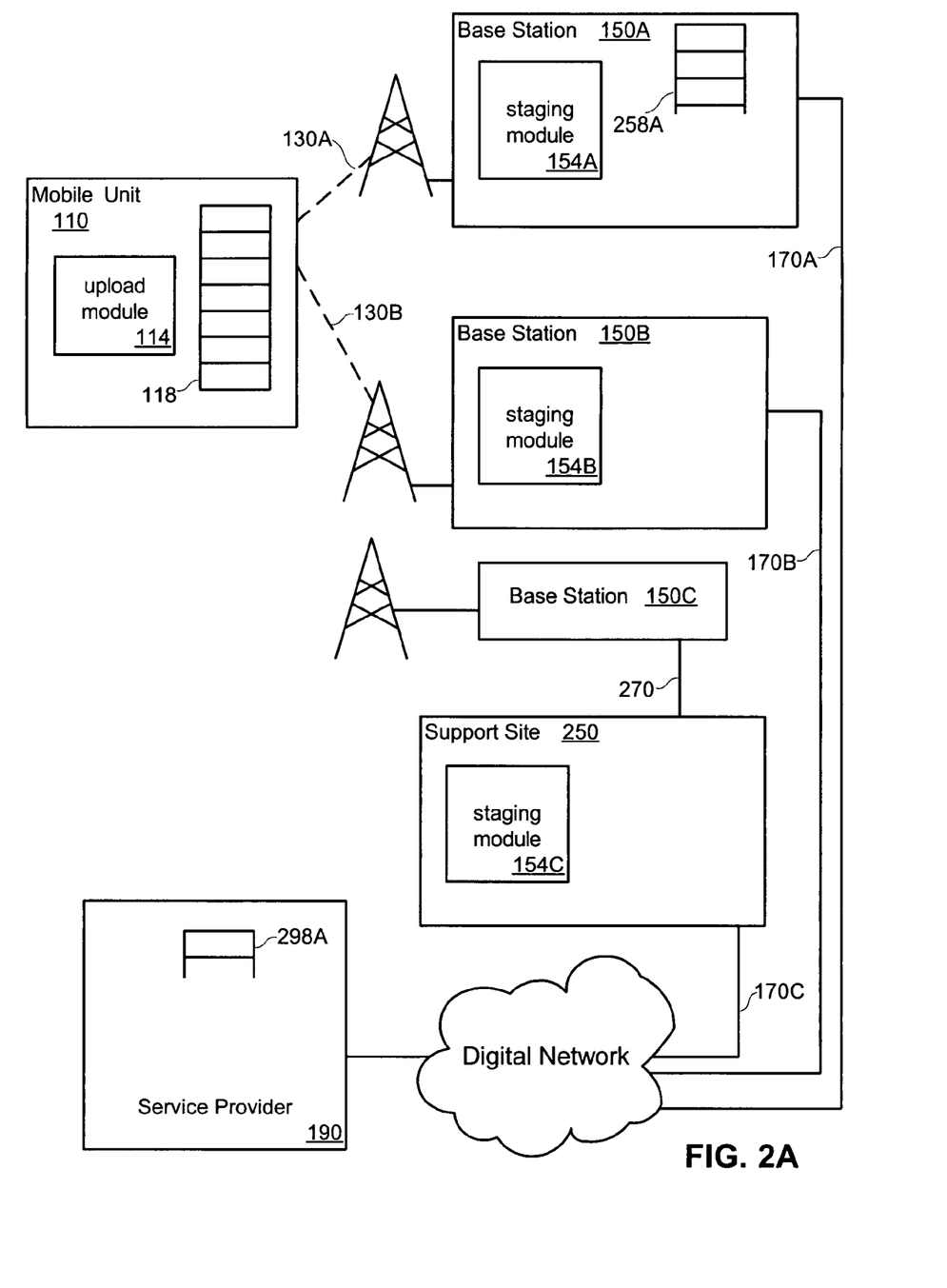
FIGS. 2A-2B show one implementation of a data upload from a moving mobile unit through staging modules in several different base stations.
Figure 2B:
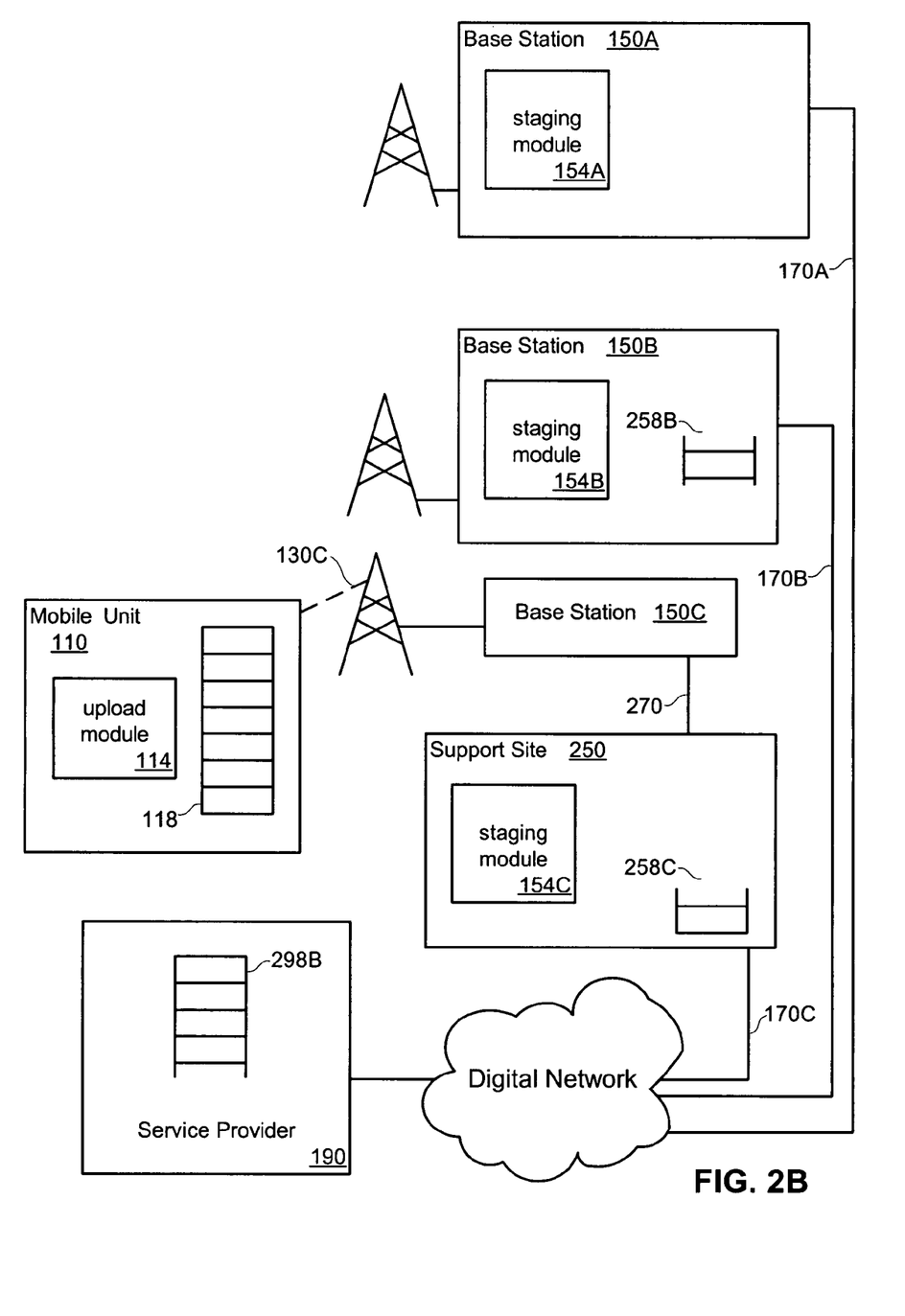

FIGS. 2A and 2B show an environment in which a moving mobile unit uploads data through staging modules in several different base stations. In this situation, the mobile unit is handed over from one base station to another as it moves in and out of range with the various base stations.

FIG. 2A shows mobile unit 110 communicating with base station 150A, similar to the situation discussed above in FIG. 1A. A portion 258A of upload data set 118 has been transferred through wireless link 130A, and is depicted as being present in base station 150A. A smaller portion 298A of the upload data set 118 is depicted as having reached service provider 190 through the network connection 170A. In the example of FIG. 2A, however, mobile unit 110 is in motion. This motion may arise because a user of mobile unit 110 is traveling from one location to another (e.g., by train, by car, on foot, or by other means). As a result, mobile unit 110 has initiated contact with a different base station 150B, which mobile unit 110 is approaching. This contact is generally initiated in a make-before-break handover, so that mobile unit can avoid a transient loss of wireless connectivity (although this need not be the case with regard to the present invention). Once a new wireless link 130B has been established to connect mobile unit 110 with the new base station 150B, the old wireless link 130A is terminated. The mobile unit 110 then continues the upload through the new wireless link 130B. The upload to base station 150B is managed by a staging module 154B in base station 150B. A network connection 170B connects base station 150B to service provider 190.

The handover in FIG. 1A may occur in situations where mobile unit 110 is stationary. For example, if mobile unit is operating at a location that within access to both of base stations 150A and 150B, then the wireless base stations may decide among themselves which should be used to serve the mobile unit. If base station 150A becomes heavily loaded with links initiated by other mobile units, it may decrease its load by handing over mobile unit 110 to base station 150B.

FIG. 2B shows a subsequent snapshot of the upload activity from FIG. 2A. In this depiction, mobile unit 110 has continued to move, and has been handed over to yet a third base station 150C. Mobile unit 110 continues the upload process, now through a third wireless link 130C to base station 150C. At this point, the portion of upload data set 118 that was transmitted to base station 150A has reached backup service provider 190. This portion (258A in FIG. 2A) has therefore been cleared from the memory in base station 150A. A subsequent portion 258B of upload data set 118 has been transmitted to base station 150B, and is being forwarded to backup service provider 190 through network connection 170B.

In FIG. 2B, the final portion of upload data set 118 has just been transmitted from mobile unit 110 via wireless link 130C to base station 150C. In this example, however, wireless base station 150C does not include a staging module. Such a situation may arise, for example, if base station 150C has not been upgraded with software and/or hardware to provide the services of a staging module. The final portion 258C of upload data set 118 is therefore stored instead by a staging module 154C that is provided at an upstream support site 250.

An intermediate link 270 connects base station 150C with support site 250. The deployment of support site 250 and intermediate link 270 can be made with consideration of the delay introduced by intermediate link 270. In one implementation, intermediate link 270 is designed to avoid transmission delays; this factor may require that support site 250 is deployed geographically close to base station 150C. By designing intermediate link 270 to avoid transmission delays, a network operator can increase the effectiveness of staging module 154C, which relies on intermediate link 270 to communicate with mobile units.

As depicted in FIG. 2B, support station 250 has started transferring the final portion of upload data set 118 to backup service provider 190 through a network connection 170C. If it is no longer needed, the wireless link 130C can now be terminated. The forwarding of data can then continue from staging modules 154B and 154C, through network connections 170B and 170C respectively, until the entire upload data set 118 has been received at backup service provider 190.

Figure 3:
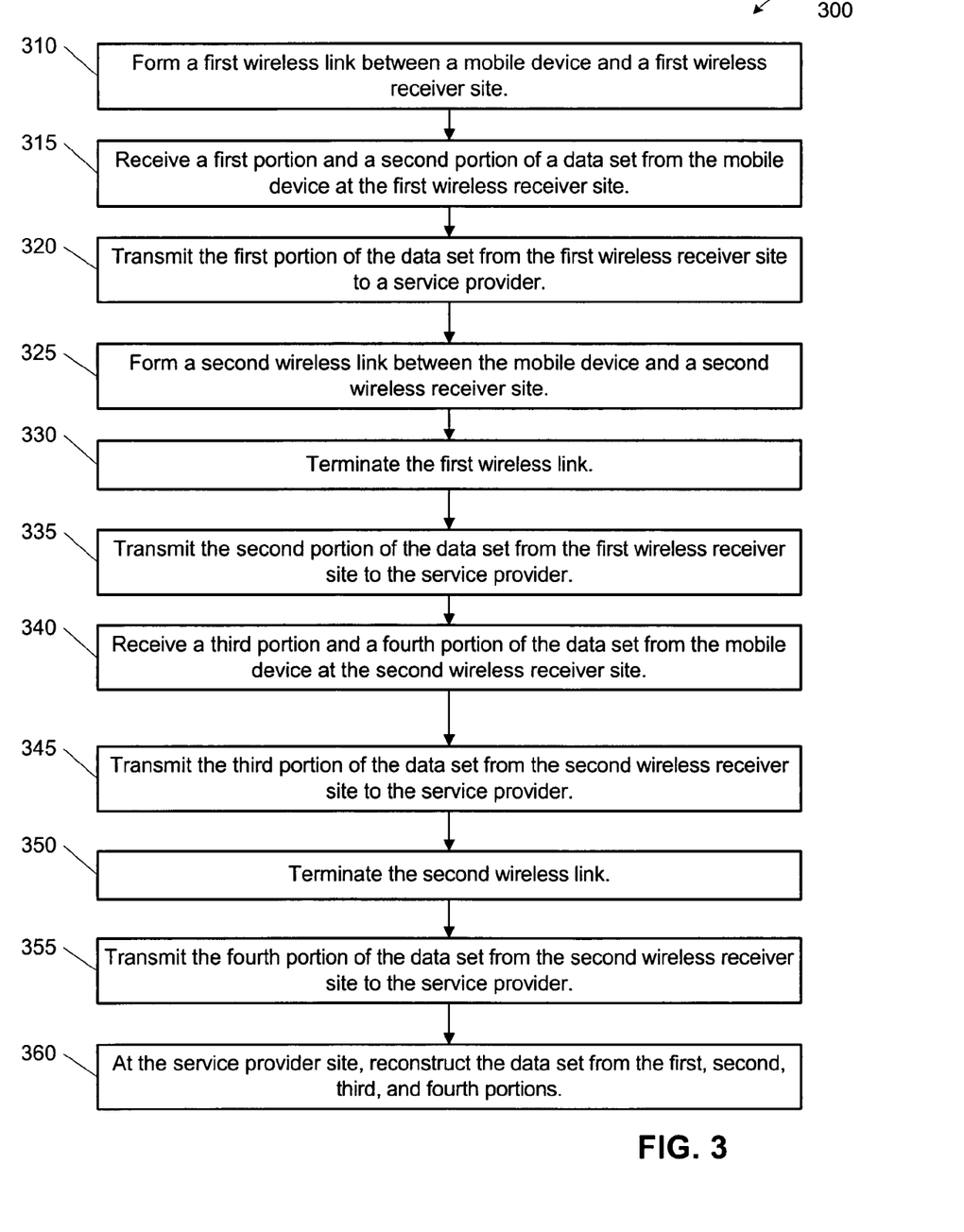
FIG. 3 is a flow diagram for one implementation of a method of uploading data.

FIG. 3 is a flow chart of one embodiment of a method 300 for uploading data from a mobile device. The method uses a staging module or data buffer at an intermediate node in one or more communications paths between the mobile device and the destination for the uploaded data. The method commences at act 310 by forming a first wireless link between a mobile device and a first wireless receiver site. In act 315, the first wireless receiver site receives a first portion and a second portion of a data set from the mobile device. The first wireless receiver site transmits the first portion of the data set to a service provider in act 320. A second wireless link is then formed in act 325 between the mobile device and a second wireless receiver site. The first wireless link is terminated in act 330.

The second portion of the data set is transmitted in act 335 from the first wireless receiver site to the service provider. In act 340, the second wireless receiver site receives a third portion and a fourth portion of the data set from the mobile device. The second wireless receiver site transmits the third portion of the data set to the service provider in act 345. The second wireless link is terminated in act 350.

In act 355, the fourth portion of the data set from is transmitted from the second wireless receiver site to the service provider. The service provider site then reconstructs the data set in act 360 from the first, second, third, and fourth portions.

Figure 4:
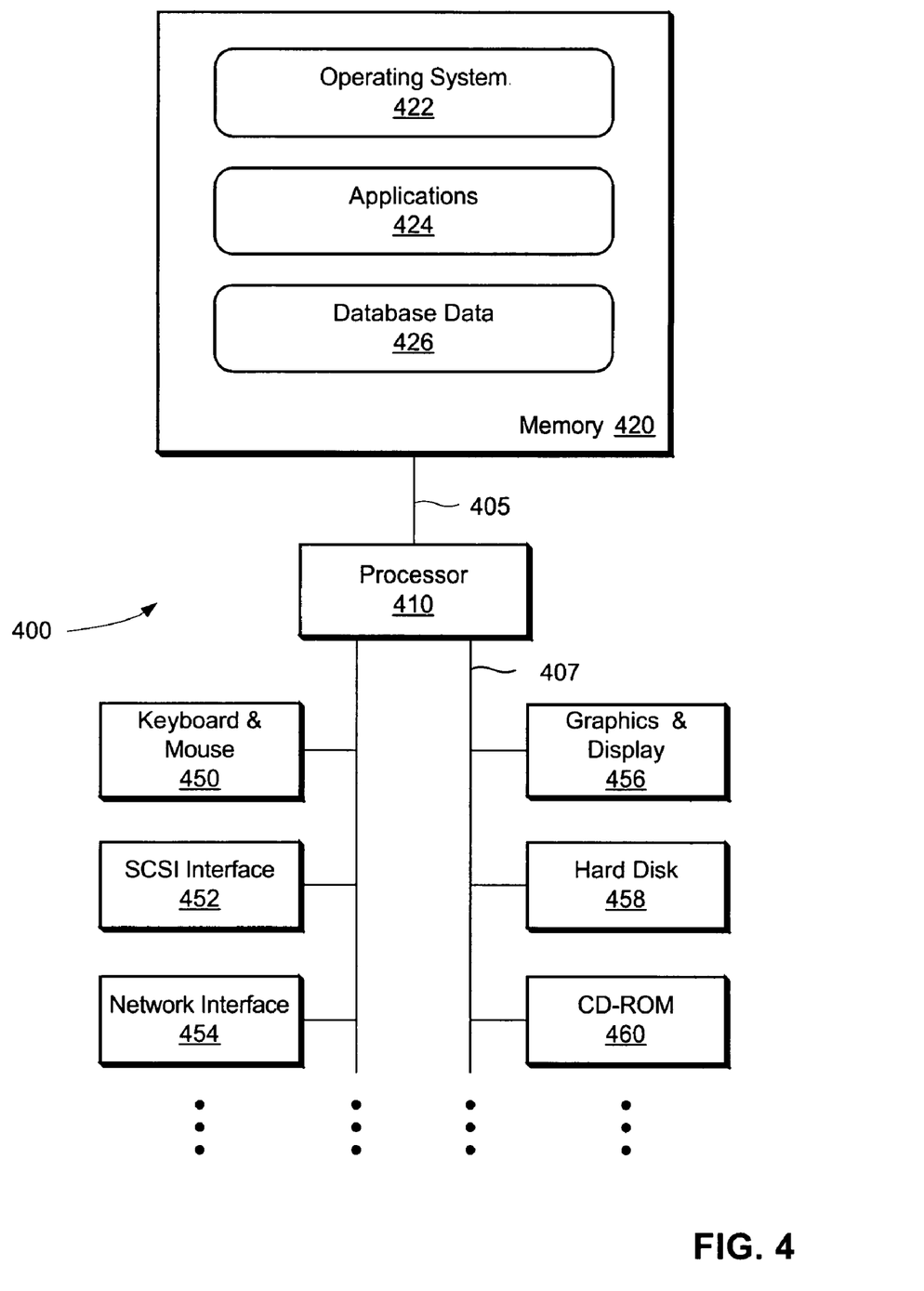
FIG. 4. is a block diagram of one implementation of a computer system that may be used for one or more of the techniques described herein.

FIG. 4 is a block diagram of one implementation of a computer system 400 that may be used for one or more of the techniques described herein. For example, the computer system 400, or portions thereof, may be used to implement a mobile device, or systems that support the operations of a base station, a support station, or a service provider. The computer system 400 may include a processor 410 and a memory 420 coupled together by a communications bus 405. The processor 410 may be a single processor or a number of individual processors working together. It is also contemplated that the processor 410 may be one or more virtual processors usable with interpreted languages. The memory 420 may be a random access memory (RAM) or some other dynamic storage device and may be capable of storing instructions to be executed by the processor, e.g., an operating system 422 and applications 424, as well as database data 426. The operating system 422 may include software for implementing a file system, managing wireless communications, managing user preferences, or combinations thereof, among others. The applications 424 may include cellular communications applications, personal organizer applications, computational applications, accounting software, email applications, archiving software, backup software, interfaces to archiving software, API modules, volume replicators, encryption software, hashing software, CDP software, user interfaces, or combinations thereof, among others. The memory 420 may be augmented to include auxiliary storage such as a Single Inline Memory Module (SIMM) card, a flash memory, and/or a hard disk, and may also be used for storing temporary variables or other intermediate information, such as data to be uploaded, during the execution of instructions by the processor 410.

The computer system 400 may also include devices such as a keyboard and mouse 450, a telephone numeric keypad (not shown), a SCSI interface 452, one or more network interfaces 454 supporting wired and/or wireless communications, a graphics and display 456, a hard disk 458, and a CD-ROM 460, all of which are coupled to the processor 410 by a communications bus 407. It will be apparent to those having ordinary skill in the art that the computer system 400 may also include numerous elements not shown in the figure, such as additional storage devices, communications devices, input devices and output devices, as illustrated by the ellipses shown.

FIGS. 1A-1C, 2A-2B, and 3 illustrate some of the many operational examples of the techniques of the present invention. Those having ordinary skill in the art will readily recognize that certain steps or operations described herein may be eliminated or taken in an alternate order. Moreover, various operations discussed with respect to 1A-1C, 2A-2B, and 3 may be implemented as one or more software programs for a computer system and encoded in a computer readable medium as instructions executable on one or more processors. The computer readable medium may include a solid-state storage medium, a magnetic storage medium, or an optical storage medium, or combinations thereof. The software programs may also be carried in a communications medium conveying signals encoding the instructions. Separate instances of these programs may be executed on separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above may be utilized with a variety of different storage devices and computing systems with variations in, for example, the number of processors, base stations, or mobile units, among others.

Those having ordinary skill in the art will readily recognize that the techniques and methods discussed above may be implemented in software using a variety of computer languages, including, for example, traditional computer languages such as assembly language, Pascal, and C; object oriented languages such as C++, C#, and Java; and scripting languages such as Perl and Tcl/Tk. Additionally, the software 422 or 424 may be provided to the computer system via a variety of computer readable media including electronic media (e.g., flash memory), magnetic storage media (e.g., hard disk 458, a floppy disk, etc.), or optical storage media (e.g., CD-ROM 460). Communications media conveying signals encoding the instructions may also be used to provide the software 422 or 424 (e.g., a transmission line or optical cable coupled to the network interface 454).

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    forming a first wireless link between a device and a first wireless receiver site;
    receiving a first portion of a data set from the device, wherein
        the first portion of the data set is transferred via the first wireless link at a first data rate;
    receiving a second portion of the data set from the device;
    relinquishing the first wireless link;
    before the relinquishing the first wireless link, transmitting the first portion of the data set from the first wireless receiver site to a service provider, wherein
        the first portion of the data set is transferred from the first wireless receiver site to the service provider at a second data rate,
        the first data rate is greater than the second data rate, and
        the transmitting the first portion of the data set before the relinquishing the first wireless link is performed in response to the first data rate being greater than the second data rate; and
    after the relinquishing the first wireless link, transmitting the second portion of the data set from the first wireless receiver site to the service provider.

2. The method of claim 1, wherein the device comprises a mobile device and the forming, the receiving the first portion of data, the relinquishing, and the transmitting the first portion of the data set are performed at the first wireless receiver site.

3. The method of claim 1, wherein:
    the data set comprises at least one of: backup data or archival data, for information stored on the device; and
    the relinquishing comprises terminating the first wireless link.

4. The method of claim 1, further comprising:
    forming a second wireless link between the device and a second wireless receiver site;
    receiving the second portion of the data set from the device at the second wireless receiver site; and
    transmitting the second portion of the data set from the second wireless receiver site to the service provider.

5. The method of claim 4, further comprising:
    reconstructing the data set using the first and second portions of the data set.

6. The method of claim 5, wherein the data set comprises a backup request, the method further comprising:
    generating a data backup from the data set.

7. The method of claim 6, further comprising:
    after generating the data backup, transmitting a backup confirmation from the service provider to the device.

8. The method of claim 7, wherein the generating the data backup comprises:
   applying the backup request to a previous version of the data backup.
9. The method of claim 1, further comprising:
   forming a second wireless link between the device and a second wireless receiver site;
   receiving the second portion of the data set from the device at the second wireless receiver site;
   transmitting the second portion of the data set from the second wireless receiver site to the service provider; and
   communicating a confirmation message to the device, wherein the confirmation message indicates that a valid backup copy of the data set has been constructed based at least in part on the first and second portions of the data set.
10. The method of claim 9, further comprising:
    deleting the data set from the device in response to the confirmation message.
11. A system comprising:
    means for forming a first wireless link between a device and a first wireless receiver site;
    means for receiving a first portion of a data set from the device, wherein
       the first portion of the data set is transferred via the first wireless link at a first data rate;
    means for receiving a second portion of the data set from the device;
    means for relinquishing the first wireless link;
    means for, before the relinquishing the first wireless link, transmitting the first portion of the data set from the first wireless receiver site to a service provider, wherein
       the first portion of the data set is transferred from the first wireless receiver site to the service provider at a second data rate,
       the first data rate is greater than the second data rate, and
       the transmitting the first portion of the data set before the relinquishing the first wireless link is performed in response to the first data rate being greater than the second data rate; and
    means for, after the first wireless link has been relinquished, transmitting the second portion of the data set from the first wireless receiver site to the service provider.
12. The system of claim 11, wherein the device comprises a mobile device.
13. The system of claim 11, further comprising at least one of:
    means for performing data archiving using the data set; or
    means for performing a remote data backup using the data set.
14. The system of claim 11, further comprising:
    means for forming a second wireless link between the device and a second wireless receiver site, wherein the means for receiving the second portion of the data set from the device is located at the second wireless receiver site;
    means for transmitting the second portion of the data set from the second wireless receiver site to the service provider; and
    means for communicating a confirmation message to the device, wherein the confirmation message indicates that a valid backup copy of the data set has been constructed based at least in part on the first and second portions of the data set.
15. The system of claim 14, further comprising:
    means for deleting, wherein the means for deleting are configured to delete the data set from the device in response to the confirmation message.
16. A non-transient computer-readable medium having encoded thereon instructions executable by one or more processors for:
    forming a first wireless link between a device and a first wireless receiver site;
    receiving a first portion of a data set from the device, wherein
       the first portion of the data set is transferred via the first wireless link at a first data rate;
    receiving a second portion of the data set from the device;
    relinquishing the first wireless link;
    before the relinquishing the first wireless link, transmitting the first portion of the data set from the first wireless receiver site to a service provider, wherein
       the first portion of the data set is transferred from the first wireless receiver site to the service provider at a second data rate,
       the first data rate is greater than the second data rate, and
       the transmitting the first portion of the data set before the relinquishing the first wireless link is performed in response to the first data rate being greater than the second data rate; and
    after the relinquishing the first wireless link, transmitting the second portion of the data set from the first wireless receiver site to the service provider.

* * * * *